(12) United States Patent
Atsumi

(10) Patent No.: US 7,962,829 B2
(45) Date of Patent: Jun. 14, 2011

(54) PARITY PREDICTION CIRCUIT AND LOGIC OPERATION CIRCUIT USING SAME

(75) Inventor: Hiroaki Atsumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 928 days.

(21) Appl. No.: 11/905,307

(22) Filed: Sep. 28, 2007

(65) Prior Publication Data

US 2008/0052610 A1    Feb. 28, 2008

Related U.S. Application Data

(63) Continuation of application No. PCT/JP2005/006297, filed on Mar. 31, 2005.

(51) Int. Cl.
*H03M 13/00* (2006.01)
(52) U.S. Cl. .......................................... 714/758
(58) Field of Classification Search ............ 714/758
See application file for complete search history.

(56) References Cited

U.S. PATENT DOCUMENTS 5,440,604 A * 8/1995 De Subijana et al. ........... 377/28
2008/0282136 A1* 11/2008 Yamashita ..................... 714/801

FOREIGN PATENT DOCUMENTS

JP          58-29054        2/1983
JP          2004-234110     8/2004

OTHER PUBLICATIONS

English language version of International Search Report (PCT/ISA/210) of International Application PCT/JP2005/006297 (mailed on Jul. 5, 2005).

* cited by examiner

*Primary Examiner* — Scott T Baderman
*Assistant Examiner* — Enam Ahmed

(57) ABSTRACT

In a parity prediction circuit which corrects the predicted parity using AND/OR parity inversion condition generation circuits, predicted parity and inversion conditions are corrected using an EOR condition of one of data buses. Two parity prediction logics are sufficient; the added correction logic circuit requires only the EOR condition for one data bus, and the hardware configuration can be reduced. Further, control signals from opcode signals are employed in the latter half of the logic operations, and thereby parity prediction is possible at high speed comparable with circuits which have parity prediction logic for each instruction.

18 Claims, 13 Drawing Sheets

FIG. 5

| a | b | x | $pc_{andn}$ | comment |
|---|---|---|---|---|
| 0 | 0 | 0 | 0 | |
| 0 | 1 | 0 | 1 | 1 → 0 |
| 1 | 0 | 1 | 0 | |
| 1 | 1 | 0 | 0 | 2 → 0 |

FIG. 6

| a | b | x | $pc_{andn1}$ | comment |
|---|---|---|---|---|
| 0 | 0 | 0 | 0 | |
| 0 | 1 | 1 | 0 | |
| 1 | 0 | 0 | 1 | 1 → 0 |
| 1 | 1 | 0 | 0 | 2 → 0 |

FIG. 7

| a | b | x | $pc_{andn2}$ | comment |
|---|---|---|---|---|
| 0 | 0 | 1 | 1 | 0 → 1 |
| 0 | 1 | 0 | 1 | 1 → 0 |
| 1 | 0 | 0 | 1 | 1 → 0 |
| 1 | 1 | 0 | 0 | 2 → 0 |

FIG. 8

| a | b | x | $pc_{orn}$ | comment |
|---|---|---|---|---|
| 0 | 0 | 1 | 1 | 0 → 1 |
| 0 | 1 | 0 | 1 | 1 → 0 |
| 1 | 0 | 1 | 0 | |
| 1 | 1 | 1 | 1 | 2 → 1 |

FIG. 9

| a | b | x | $pc_{orn1}$ | comment |
|---|---|---|---|---|
| 0 | 0 | 1 | 1 | 0 → 1 |
| 0 | 1 | 1 | 0 | |
| 1 | 0 | 0 | 1 | 1 → 0 |
| 1 | 1 | 1 | 1 | 2 → 1 |

FIG. 10

| a | b | x | $pc_{orn2}$ | comment |
|---|---|---|---|---|
| 0 | 0 | 1 | 1 | 0 → 1 |
| 0 | 1 | 1 | 0 | |
| 1 | 0 | 1 | 0 | |
| 1 | 1 | 0 | 0 | 2 → 0 |

FIG. 11

| INSTRUCTION | SEL1 | SEL2 | invert parity |
|---|---|---|---|
| and | $pchg_{and}$ | 0 | 0 |
| or | $pchg_{or}$ | 0 | 0 |
| andn | $pchg_{and}$ | 1 | 0 |
| orn | $pchg_{or}$ | 1 | 1 |
| andn1 | $pchg_{or}$ | 1 | 0 |
| orn1 | $pchg_{and}$ | 1 | 1 |
| andn2 | $pchg_{or}$ | 0 | 1 |
| orn2 | $pchg_{and}$ | 0 | 1 |

FIG. 12

| INSTRUCTION | SEL1 | SEL2 | invert parity |
|---|---|---|---|
| and | $pchg_{and}$ | 0 | 0 |
| or | $pchg_{or}$ | 0 | 0 |
| andn | $pchg_{and}$ | 1 | 0 |
| orn | $pchg_{or}$ | 1 | 0 |
| andn1 | $pchg_{or}$ | 1 | 0 |
| orn1 | $pchg_{and}$ | 1 | 0 |
| andn2 | $pchg_{or}$ | 0 | 0 |
| orn2 | $pchg_{and}$ | 0 | 0 |

FIG. 16 PRIOR ART

| INSTRUCTION | OPERATION |
|---|---|
| and | $a \& b$ |
| andn | $a \& \bar{b}$ |
| andn1 | $\bar{a} \& b$ |
| andn2 | $\bar{a} \& \bar{b}$ |
| or | $a\|b$ |
| orn | $a\|\bar{b}$ |
| orn1 | $\bar{a}\|b$ |
| orn2 | $\bar{a}\|\bar{b}$ |

FIG. 17 PRIOR ART

| a | b | x | $pc_{and}$ | comment |
|---|---|---|---|---|
| 0 | 0 | 0 | 0 | |
| 0 | 1 | 0 | 1 | $1 \to 0$ |
| 1 | 0 | 0 | 1 | $1 \to 0$ |
| 1 | 1 | 1 | 1 | $2 \to 1$ |

FIG. 18 PRIOR ART

| a | b | x | $pc_{or}$ | comment |
|---|---|---|---|---|
| 0 | 0 | 0 | 0 | |
| 0 | 1 | 1 | 0 | |
| 1 | 0 | 1 | 0 | |
| 1 | 1 | 1 | 1 | $2 \to 1$ |

PARITY PREDICTION CIRCUIT AND LOGIC OPERATION CIRCUIT USING SAME

CROSS REFERENCE TO RELATED APPLICATIONS

This application is a continuation of International Application No. PCT/JP 2005/006297, filed on Mar. 31, 2005, now pending, herein incorporated by reference.

TECHNICAL FIELD

This invention relates to a parity prediction circuit of an operation circuit which executes logic operations (logical AND, logical OR) using data with parity added, and to a logic operation circuit using this parity prediction circuit. In particular, this invention relates to a parity prediction circuit for an operation circuit having functions for inverting at least one of input operands to perform operations, and a logic operation circuit using this parity prediction circuit.

BACKGROUND ART

Improvements in the processing speeds of CPUs (Central Processing Units) have been accompanied by increasing complexity in CPU configurations. For example, CPUs comprise computation units, instruction units, cache memory, cache controller units, and various registers. With advances in integration technology in recent years, there have been trends toward incorporation of CPUs on a single chip, and there have been demands for simplified circuit configurations and faster operation for each unit in a CPU.

In such a computation unit, there exist adders/subtractors, logical computation (operation) circuits, shift circuits, and similar. Of these, the logic operation circuits handle logic operations to compute logical AND and logical OR results, performing logic operations on a pair of input operands. For example, a logic operation circuit 200 is configured as shown in FIG. 15. As in FIG. 15, one of the input operands is the a-bus, and the other is the b-bus. In this explanation it is assumed that each operand has 8 bits. That is, the a-bus and b-bus for the operands consist of data bits a0 to a7 and a parity bit ap, and data bits b0 to b7 and a parity bit bp.

The first input port 100 receives data a0 to a7 of an operand, and the first parity port 102 receives the parity bit ap. The second input port 104 receives the data b0 to b7 of an operand, and the second parity port 106 receives the parity bit bp. The instruction port 108 receives logic operation instructions from an instruction unit (not shown). To facilitate the explanation, in logic operations, instructions in cases in which the instruction independently inverts both the operands are taken to be the eight instructions shown in FIG. 16.

This logic operation circuit 200 has an AND circuit 130, a OR circuit 132, and a selector 140. The pair of operands a-bus and b-bus are input, via the EOR circuits 112 to 118, to both the AND circuit 130 and the OR circuit 132.

On the other hand, logic operation instructions at the instruction port 108 are decoded by a decoder 110 and input to the selector 140 and to the EOR circuits 112 to 118. The selector 140 outputs as data the operation result of either the AND circuit 130 or the OR circuit 132, according to the instruction. The EOR circuits 112 to 118 invert the input data and output the results to the AND circuit 130 and OR circuit 132, according to the instruction.

When instructions for logical AND and logical OR operations which invert the input data are processed, in order to minimize the delay time, a parity prediction circuit 134 is provided for each instruction.

Here, parity prediction in basic logic operations is explained. In logical AND/OR operations, as shown in FIG. 15, the parity bit ap is treated as the number of bit "1" on the a-bus, and the parity bit bp is treated as the number of bit "1" on the b-bus. The parity prediction performs a prediction by taking into how increase or decrease the total bit number of "1" on the bus.

FIG. 17 explains the truth table for an AND operation for one bit and conditions of parity inversion. In FIG. 17, the four patterns for input of "0" and "1" as the two inputs 'a' and 'b', the result 'x' of an AND operation on the two inputs 'a' and 'b', a parity change signal PCand, and comments on changes in the number of "1" in the two inputs and the operation results are shown. PCand in FIG. 17 is the condition for change in parity due to a one-bit AND operation; the total number of "1" bits in the input data 'a' and 'b' and the total number of "1" bits in the AND operation result 'x' are compared, and as indicated in the Comment column, if the number of bit "1" in the two inputs is different from the number of bit "1" in the operation result 'x', the result is "1", and if the same, the result is "0".

More specifically, in FIG. 17, if a=0 and b=0 then the AND operation result is x=0, and there is no change between the number of "1" bits and the operation result, so that PCand=0; if a=0 and b=1, the AND operation result is x=0, but there is a change from the total number of "1" bits, which is 1, to the operation result x=0, so that PCand=1.

The total number of "1" bits on the a-bus and b-bus can be determined by taking the EOR of the a-bus parity bit ap and the b-bus parity bit bp. An EOR result of "0" indicates that the sum is an even number, and an EOR result of "1" indicates that the sum is an odd number. From FIG. 17, it is seen that PCand=a|b (the OR of a and b).

FIG. 18 explains the truth table for an OR operation for one bit and conditions of parity inversion. In FIG. 18, similarly to FIG. 17, the four patterns for input of "0" and "1" as the two inputs 'a' and 'b', the result 'x' of an OR operation on the two inputs 'a' and 'b', a parity change signal PCor, and comments on changes in the number of "1" in the two inputs and the operation results are shown. PCor in FIG. 18 is the condition for change in parity due to a one-bit OR operation; the total number of "1" bits in the input data 'a' and 'b' and the total number of "1" bits in the OR operation result 'x' are compared, and as indicated in the Comment column, if the number of "1" bits in the two inputs is different from the number of "1" bits in the operation result 'x', the result is "1", and if the same, the result is "0".

More specifically, in FIG. 18, if a=0 and b=0 then the OR operation result is x=0, and there is no change between the number of "1" bits and the operation result, so that PCor=0; if a=1 and b=1, the OR operation result is x=1, but there is a change from the total number of "1" bits from "2" to the operation result x=1, so that PCor=1. From FIG. 18, it is seen that PCor=a&b (the AND of a and b).

The total number of "1" bits in these two inputs can be determined from the EOR (exclusive OR) of the parity bits ap and bp. An EOR result for ap and bp of "0" indicates that the sum is an even number, and an EOR result for ap and bp of "1" indicates that the sum is an odd number.

For example, when the bus width is 8 bits, and a parity bit is added in byte (8-bit) units, the AND operation parity prediction bit rpand is as indicated by equation (1) below. Here, ap, bp, and rp (the predicted parity bit) are odd parity.

[Equation 1]

$$\begin{aligned} rp_{and} &= (pc_{and7} \oplus \ldots \oplus pc_{and0}) \oplus \overline{(ap \oplus bp)} \\ &= (a_7 \mid b_7) \oplus \ldots \oplus (a_0 \mid b_0) \oplus \overline{(ap \oplus bp)} \\ &= pchg_{and} \oplus \overline{(ap \oplus bp)} \end{aligned} \quad (1)$$

From equation (1), the inversion condition signal pchgand is as given by equation (2) below.
[Equation 2]

$$pchg_{and} = (a_7 \mid b_7) \oplus \ldots \oplus (a_0 \mid b_0) \quad (2)$$

Similarly, the OR operation predicted parity bit rpor is as given by equation (3) below. Here, ap, bp, and rp (the predicted parity bit) are odd parity.

[Equation 3]

$$\begin{aligned} rp_{or} &= (pc_{or7} \oplus \ldots \oplus pc_{or0}) \oplus \overline{(ap \oplus bp)} \\ &= (a_7 \& b_7) \oplus \ldots \oplus (a_0 \& b_0) \oplus \overline{(ap \oplus bp)} \\ &= pchg_{or} \oplus \overline{(ap \oplus bp)} \end{aligned} \quad (3)$$

From equation (3), the inversion condition signal pchgor is as given by equation (4) below.
[Equation 4]

$$pchg_{or} = (a_7 \& b_7) \oplus \ldots \oplus (a_0 \& b_0) \quad (4)$$

Then, the following obtains.
In the case of andn/orn to invert the b-bus data for the sub signal, the predicted parity bits rpandn and rporn are as indicated by equation (5) below.

[Equation 5]

$$\begin{aligned} rp_{andn} &= \overline{(a_7 \mid \overline{b_7}) \oplus \ldots \oplus (a_0 \mid \overline{b_0}) \oplus ap \oplus bp} \\ rp_{orn} &= \overline{(a_7 \& \overline{b_7}) \oplus \ldots \oplus (a_0 \& \overline{b_0}) \oplus ap \oplus bp} \end{aligned} \quad (5)$$

As described above, in a parity prediction circuit, the prediction logic of generation of inversion condition signals differs for each instruction. However, having parity prediction logic for eight instructions in FIG. 16 greatly increases the circuit scale. For this reason, in the following the de Morgan theorem of equation (6) below is applied to reduce the circuit scale.

[Equation 6]

$$\begin{aligned} \overline{a} \& b &= \overline{a \mid \overline{b}} \\ \overline{a} \mid b &= \overline{a \& \overline{b}} \\ \overline{a} \& \overline{b} &= \overline{a \mid b} \\ \overline{a} \mid \overline{b} &= \overline{a \& b} \end{aligned} \quad (6)$$

That is, using the relation in equation (6), a circuit is shared for AND instructions for andn1 and orn, for orn1 and andn, for andn2 and or, and for orn2 and in FIG. 16, so that the circuit scale is reduced. FIG. 19 shows an example of the configuration of a first prior art parity prediction circuit 134 to which this relation is applied.

The parity prediction circuit 134 of FIG. 19 has a first OR prediction logic circuit 200, which generates an OR logic inversion condition signal pchgor from inputs 'a' and 'b'; a first AND prediction logic circuit 202, which generates an AND logic inversion condition signal pchgand from inputs 'a' and 'b'; a second OR prediction logic circuit 204, which generates an OR logic inversion condition signal pchgorn from input 'a' and the inverse of 'b' resulting when the inverter 210 inverts input 'b'; a second AND prediction logic circuit 206, which generates an AND logic inversion condition signal pchgandn from input 'a' and the inverse of 'b' resulting when the inverter 212 inverts input 'b'; and a selector 208, which selects an output of these circuits 200 to 206 using the decoding signal of the above-described decoder 110.

In order to obtain the total number of bit "1" in the above-described a-bus and b-bus data, the parity prediction circuit 134 has an inverted EOR circuit 220 which performs an EOR logic operation on the parity bit ap of the a-bus and the parity bit bp of the b-bus and inverts the result, an EOR circuit 224 which performs an EOR logic operation on the output of the EOR circuit 220 and the inverted parity signal (when a parity is added to data with odd number of bits, this signal is set to "1" on certain instructions), and an EOR circuit 226 which performs an EOR logic operation on the output of the selector 208 (inversion condition signal) and the output of the EOR circuit 224.

That is, the first OR prediction logic circuit 200 computes pchgor of equation (4), the second OR prediction logic circuit 204 computes pchgorn similarly to equation (4), the first AND prediction logic circuit 202 computes pchgand of equation (2), and the second AND prediction logic circuit 206 computes pchgandn similarly to equation (2).

Hence one of rpand, rpor, rporn, rpandn of equation (1), equation (3) and equation (5) is output from EOR circuit 226 as the parity prediction signal rp, according to the logic operation instruction of FIG. 16 (see for example Japanese Patent Laid-open No. S58-029054, FIG. 2).

On the other hand, in a second parity prediction circuit 134 of the prior art shown in FIG. 20, a first OR prediction logic circuit 200 which generates OR logic inversion condition signals from two inputs, a first AND prediction logic circuit 202 which generates AND logic inversion condition signals from two inputs, and a selector 208 are provided, and moreover EOR circuits 214, 216 are provided before the parity prediction circuits, as logic for data inversion. Otherwise the configuration is the same as in FIG. 19. By this means, the number of prediction logic circuits can be halved.

In the first technology of the prior art shown in FIG. 19, four prediction logic circuits are required. As explained above, in order to perform the calculations of equation (2) and equation (4), these circuits require, for example, 15 logic operation elements even for 8-bit data. If the number of data bits is for example 64 bits, then a configuration eight times greater is required, so that the scale of the circuit configuration becomes enormous.

On the other hand, in the second technology of the prior art shown in FIG. 20, because there are two prediction logic circuits, the circuit configuration is small compared with the first technology of the prior art, but the inversion of input data is placed before the parity prediction circuits, and so to this extent the delay is increased. In particular, when the data bit length is long, there is the problem that the delay of signals (in FIG. 20, inv a and inv b) to control inversion of data from the decoder 110 which decodes instructions in FIG. 16 becomes extremely long.

Hence an object of this invention is to provide a logic operation parity prediction circuit and logic operation circuit to rapidly perform parity prediction, while reducing the circuit scale.

A further object of the invention is to provide a logic operation parity prediction circuit and logic operation circuit to reduce the circuit scale of the hardware of logic operation circuits having parity prediction functions.

Still a further object of the invention is to provide a logic operation parity prediction circuit and logic operation circuit to realize faster operation of logic operation circuits having parity prediction functions.

SUMMARY OF THE INVENTION

In order to attain these objects, a logic operation parity prediction circuit of this invention has a first parity inversion condition computation circuit, which computes the parity inversion condition for AND logic operations for a pair of input operands; a second parity inversion condition computation circuit, which computes the parity inversion condition for OR logic operations for the pair of input operands; a selector, which selects the parity inversion condition of the first parity inversion condition computation circuit or of the second parity inversion condition computation circuit, according to a logic operation instruction; a parity prediction circuit, which performs EOR operations on parity bits of the pair of input operands; a correction signal generation circuit, which performs EOR operations on one of the input operands and generates a correction signal; and a correction circuit, which uses the correction signal and the parity inversion condition of the selector, corrects the parity prediction signal of the parity prediction circuit, and outputs a predicted parity according to the logic operation instruction.

Further, a logic operation circuit of this invention has a logic operator, which executes a logic operation on a pair of input operands and outputs the logic operation result, and a logic operation parity prediction circuit, which predicts the parity of the logic operation result. The logic operation parity prediction circuit has a first parity inversion condition computation circuit, which computes the parity inversion condition for AND logic operations for the pair of input operands; a second parity inversion condition computation circuit, which computes the parity inversion condition for OR logic operations for the pair of input operands; a selector, which selects the parity inversion condition of the first parity inversion condition computation circuit or of the second parity inversion condition computation circuit, according to a logic operation instruction; a parity prediction circuit, which performs EOR operations on parity bits of the pair of input operands; a correction signal generation circuit, which performs EOR operations on one of the input operands and generates a correction signal; and a correction circuit, which uses the correction signal and the parity inversion condition of the selector to correct the parity prediction signal of the parity prediction circuit, and outputs the predicted parity according to the logic operation instruction.

Further, in this invention, it is preferable that the correction signal generation circuit has an EOR circuit which performs EOR operations on the one operand.

Further, in this invention, it is preferable that the correction signal generation circuit has a parity inspection circuit for said one operand.

Further, in this invention, it is preferable that the logic operation instruction has a logical AND and a logical OR instruction including an AND and OR instruction of the inverse of at least one of the operands.

Further, in this invention, it is preferable that a selection circuit further be provided, which selectively outputs the correction signal of the correction signal generation circuit to the correction circuit using a second selection signal according to the logic operation instruction.

Further, in this invention, it is preferable that the correction circuit has a first EOR circuit, which performs EOR operations of the parity inversion condition of the selector and the parity prediction signal of the parity prediction circuit, and a second EOR circuit, which performs EOR operations of the output of the first EOR circuit and the correction signal, and outputs a predicted parity according to the logic operation instruction.

Further, in this invention, it is preferable that a control circuit be further provided which controls the predicted parity of the parity prediction circuit according to the logic operation instruction.

Further, in this invention, it is preferable that the parity inspection circuit has an operation circuit which performs EOR operations of the EOR result of the one operand and a parity bit of the one operand.

Further, in this invention, it is preferable that a selection circuit be further provided which selectively outputs the correction signal of the correction signal generation circuit to the correction circuit, using a second selection signal according to the logic operation instruction, and that the parity prediction circuit has a gate circuit which gates a parity bit of the one operand based on the inverse signal of the second selection signal, and an EOR circuit which performs EOR operations on the output of the gate circuit and the parity bit of the other operand.

Because the predicted parity and inversion condition are corrected using EOR condition of one data bus in this invention, when parity prediction logic is used for each instruction, four parity prediction logic circuits are required for inversion functions on only one of the A bus and B bus, and when independent inversion is possible on the A bus and B bus, six parity prediction logic circuits are required in the prior art, in this invention, only two parity prediction circuits are necessary; the added correction logic circuit requires only the EOR condition for one data bus, and the hardware configuration can be reduced. Further, in a circuit with normal parity added, inspection of input data is almost always executed, and so this inspection logic function can be used in common as correction logic; in this case correction functions can be realized with no increase in hardware.

Further, control signals from opcode signals are employed in the latter half of the logic operations, and so parity prediction is possible at high speed comparable with circuits which have parity prediction logic for each instruction.

BRIEF DESCRIPTION OF THE DRAWINGS

FIG. 5 is an explanatory diagram of the truth table of a logical andn;

FIG. 6 is an explanatory diagram of the truth table of a logical andn1;

FIG. 7 is an explanatory diagram of the truth table of a logical andn2;

FIG. 8 is an explanatory diagram of the truth table of a logical orn;

FIG. 9 is an explanatory diagram of the truth table of a logical orn1;

FIG. 10 is an explanatory diagram of the truth table of a logical orn2;

FIG. 11 shows the relation between instructions and control signals when a parity bit is for an odd number of bits;

FIG. 12 shows the relation between instructions and control signals when a parity bit is for an even number of bits;

FIG. 16 explains instruction codes;

FIG. 17 is an explanatory diagram of the truth table of a logical and;

FIG. 18 is an explanatory diagram of the truth table of a logical or;

PREFERRED EMBODIMENTS OF THE INVENTION

Below, embodiments of the invention are explained, in the order of a first embodiment of a logic operation parity prediction circuit, operation in the first embodiment, a second embodiment of a logic operation parity prediction circuit, and other embodiments; however, these embodiments are examples of the invention, and are not intended to exclude various modifications.

First Embodiment

Figure 1:
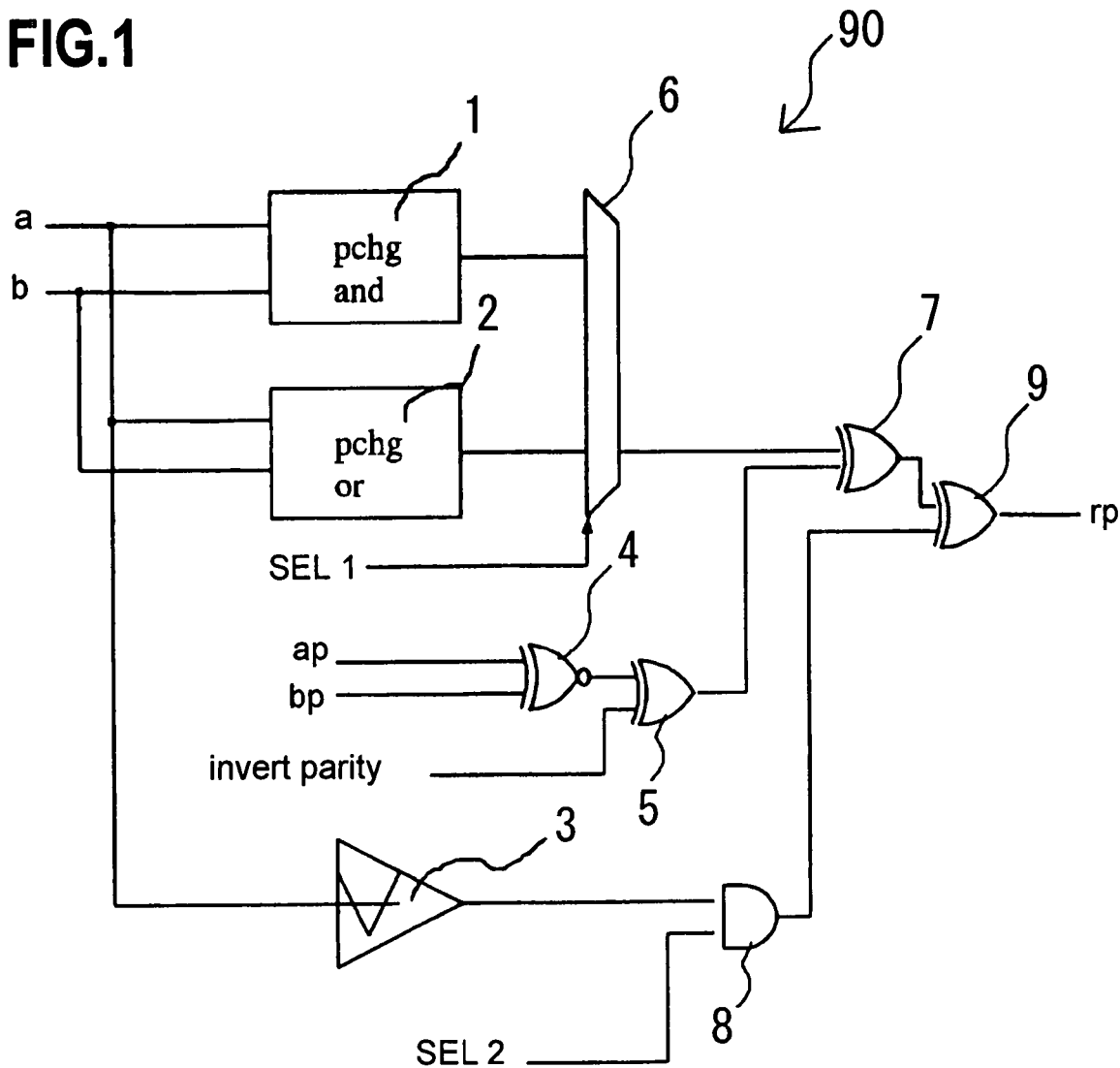
FIG. 1 is a circuit diagram of the logic operation parity prediction circuit of a first embodiment of the invention.
Figure 2:
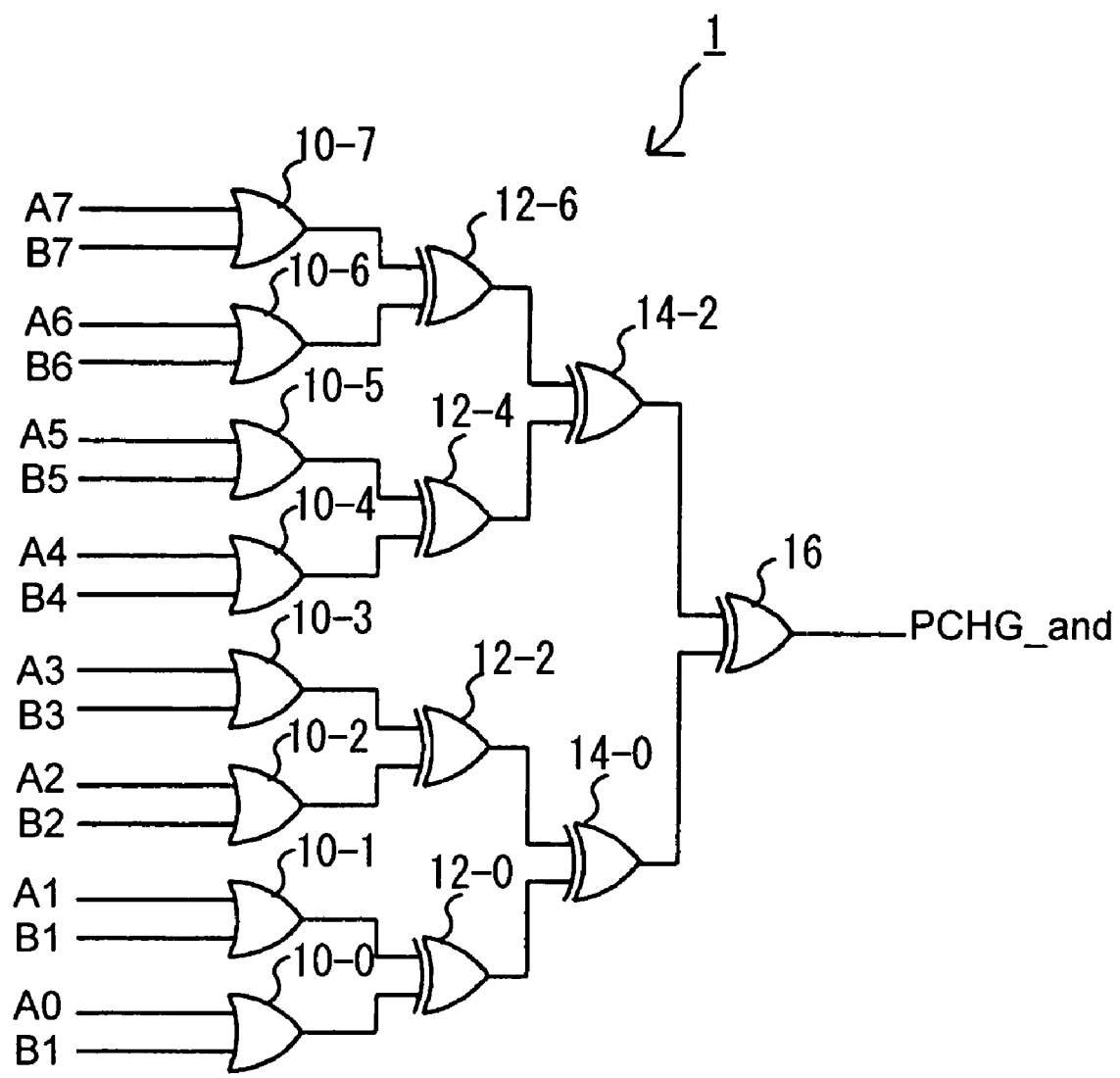
FIG. 2 is a circuit diagram of the AND inversion condition generation circuit of FIG. 1.
Figure 3:
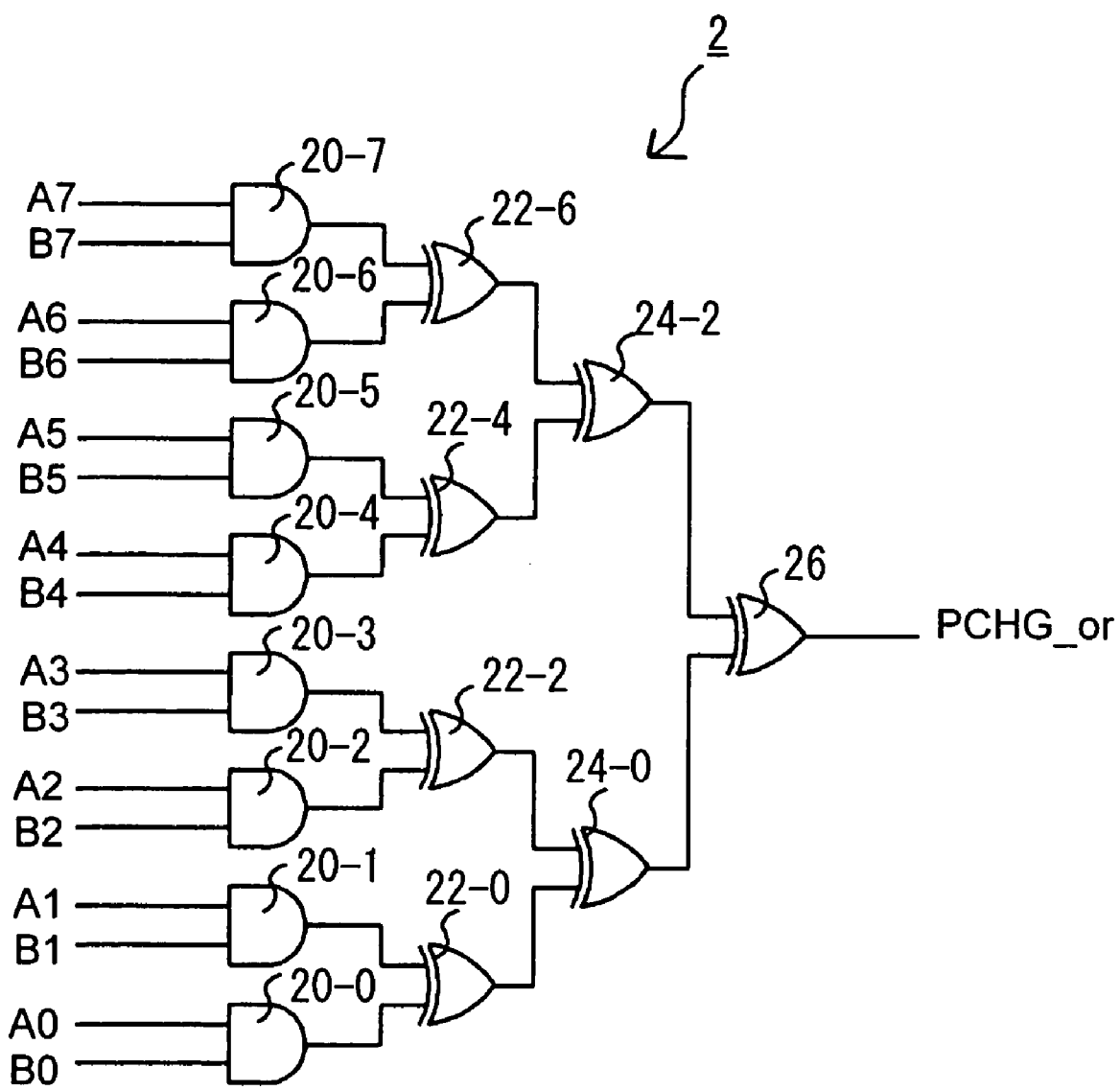
FIG. 3 is a circuit diagram of the OR inversion condition generation circuit of FIG. 1.
Figure 4:
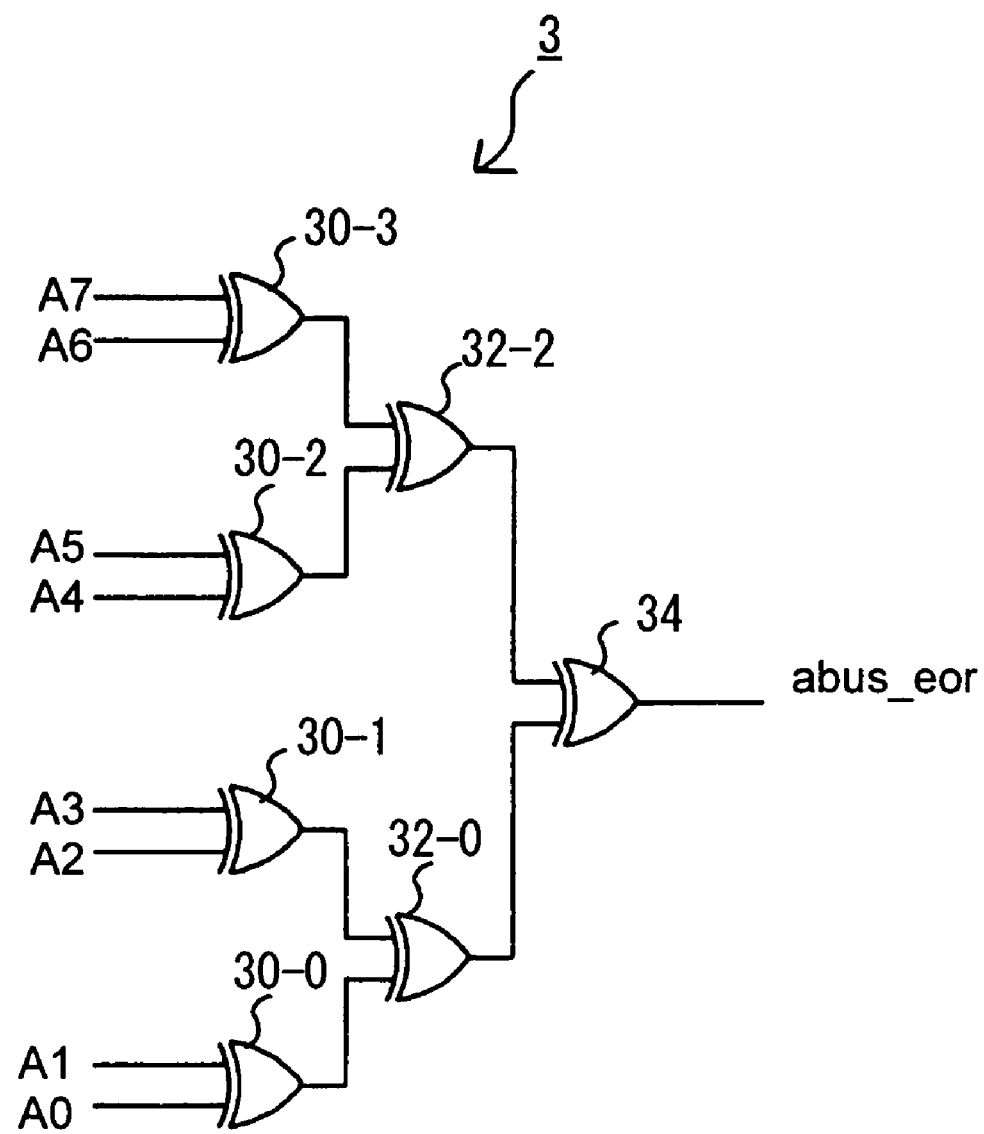
FIG. 4 is a circuit diagram of the EOR TREE circuit of FIG. 1.

FIG. 1 is a circuit diagram of the logic operation parity prediction circuit of the first embodiment of the invention, FIG. 2 is a circuit diagram of the logic circuit for generation of the AND operation parity inversion condition of FIG. 1, FIG. 3 is a circuit diagram of the logic circuit for the OR operation parity inversion condition of FIG. 1, and FIG. 4 is a circuit diagram of the EOR TREE circuit of FIG. 1.

As shown in FIG. 1, the AND prediction logic circuit (pchg and) 1 is a generation logic circuit of the parity inversion condition in the AND operation explained in FIG. 2. The OR prediction logic circuit (pchg or) 2 is a generation logic circuit of the parity inversion condition in the OR operation explained in FIG. 3. The EOR TREE circuit 3 is a logic circuit which uses EOR operations to combine the data on the a-bus explained in FIG. 4.

The parity prediction circuit 90 has a selector 6, which selects the output of a prediction logic circuit 1 or 2 based on the selection signal SEL1, an inversion EOR circuit 4 which performs an EOR of the a-bus parity bit ap and b-bus parity bit bp to obtain the total number of bit "1" of data on the above-described a-bus and b-bus and performs inversion, an EOR circuit 5 which performs an EOR logic operation on the output of the EOR circuit 4 and the invert parity signal (when a parity bit is added for odd number of bits, this signal is set to "1" on certain instructions), and an EOR circuit 7 which performs an EOR logic operation on the output of selector 6 (inversion condition signal) and the output of EOR circuit 5.

Further, the parity prediction circuit 90 has an AND circuit 8 which computes the logical product (AND) of the output of the EOR TREE circuit 3 and a second selection signal SEL2, and an EOR circuit 9 which computes the EOR of the output of the EOR circuit 7 and the output of the AND circuit 8. In the figure, the signals 'a', 'b' are respectively the data of the a-bus and b-bus. Also, ap is the parity of the a-bus data, and bp is the parity of the b-bus data. The invert parity signal is a signal which, when one parity bit is assigned to data with an odd number of bits, takes a value which depends on an instruction.

The explanation below assumes an 8-bit width for the a-bus data and b-bus data. The AND prediction logic circuit 1 computes pchgand of equation (2) as shown in FIG. 2. That is, the AND prediction logic circuit 1 has eight OR circuits 10-0 to 10-7, which compute the OR (logical sum) of corresponding bits A0 to A7 in the a-bus data and B0 to B7 in the b-bus data; four EOR circuits 12-0 to 12-6, each of which compute the EOR of the outputs of two OR circuits among the OR circuits 10-0 to 10-7; two EOR circuits 14-0 and 14-2, each of which compute the EOR of the outputs of two EOR circuits among the EOR circuits 12-0 to 12-6; and an EOR circuit 16, which computes the EOR of the outputs of the two EOR circuits 14-0 and 14-2.

The OR prediction logic circuit 2 computes pchgor of equation (4), as shown in FIG. 3. That is, the OR prediction logic circuit 2 has eight AND circuits 20-0 to 20-7, which compute the AND (logical product) of corresponding bits A0 to A7 in the a-bus data and B0 to B7 in the b-bus data; four EOR circuits 22-0 to 22-6, each of which compute the EOR of the outputs of two AND circuits among the AND circuits 20-0 to 20-7; two EOR circuits 24-0 and 24-2, which compute the EOR of the outputs of two EOR circuits among the EOR circuits 22-0 to 22-6; and an EOR circuit 26, which computes the EOR of the outputs of the two EOR circuits 24-0 and 24-2.

As shown in FIG. 4, the EOR TREE prediction logic circuit 3 has four EOR circuits 30-0 to 30-3, each of which compute the EOR of two bits among the a-bus data A0 to A7; two EOR circuits 32-0 and 32-2, each of which compute the EOR of the outputs of two among the EOR circuits 30-0 to 30-3; and an EOR circuit 34, which computes the EOR of the outputs of the two EOR circuits 32-0 and 32-2.

As explained below, in this invention, a method is employed in which, in andn/orn computations, the and/or parity is predicted in advance, the difference between andn/orn and/or is determined separately and is corrected.

Operation of the First Embodiment

FIG. 5 explains the truth table of one-bit andn operations, FIG. 6 explains the truth table of one-bit andn1 operations, FIG. 7 explains the truth table of one-bit andn2 operations, FIG. 8 explains the truth table of one-bit orn operations, FIG. 9 explains the truth table of one-bit orn1 operations, and FIG. 10 explains the truth table of one-bit orn2 operations.

In FIG. 5 through FIG. 7, similarly to FIG. 17, the four patterns for input of "0" and "1" as the two inputs 'a' and 'b', the result 'x' of an andn, andn1, and andn2 operation respectively (see FIG. 16) on the two inputs 'a' and 'b', parity change signals PCandn, PCandn1, and PCandn2, and comments on changes in the number of "1" in the two inputs and the operation results are shown.

Similarly to FIG. 17, PCandn, PCandn1, and PCandn2 are conditions for a change in parity due to one-bit andn, andn1, and andn2 operations; the total number of "1" bits in the inputs 'a' and 'b' is compared with the total number of "1" bits in the result 'x' of the andn, andn1, or andn2 operation, and as indicated in the "Comment" column, if the total number of "1" bits in the two inputs and the number of "1" bits in the operation result 'x' is a combination of even and odd numbers, or of odd and even numbers, then the value is "1", but if both numbers are even or both numbers are odd, then the value is "0".

In FIG. 8 through FIG. 10, similarly to FIG. 18, the four patterns for input of "0" and "1" as the two inputs 'a' and 'b', the result 'x' of an orn, orn1, and orn2 operation respectively (see FIG. 16) on the two inputs 'a' and 'b', parity change signals PCorn, PCorn1, and PCorn2, and comments on changes in the number of "1" in the two inputs and the operation results are shown.

Similarly to FIG. 18, PCorn, PCorn1, and PCorn2 are conditions for a change in parity due to one-bit orn, orn1, and orn2 operations; the total number of "1" bits in the inputs 'a' and 'b' is compared with the total number of "1" bits in the result 'x' of the orn, orn1, or orn2 operation, and as indicated in the "Comment" column, if the total number of "1" bits in the two inputs and the number of "1" bits in the operation result 'x' is a combination of even and odd numbers, or of odd and even numbers, then the value is "1", but if both numbers are even or both numbers are odd, then the value is "0".

On comparing the truth table for AND operations of FIG. 17 and the truth table for ANDn operations of FIG. 5, when a=1, PCandn inverts a PCand result. That is, the relation of equation (7) below obtains.

[Equation 7]

$$pc_{andn=pcand} \oplus a \quad (7)$$

Similarly in the truth table for OR operations of FIG. 18, on comparison with the truth table for ORn operations of FIG. 8, when a=0, PCorn is the inverse of PCor. That is, the relation of the following equation (8) obtains.

[Equation 8]

$$pc_{orn=pcor} \oplus \overline{a} \quad (8)$$

From this, it is possible to determine whether correction is necessary for and/or parity in andn/orn operations, depending on how many "1" bits are present on the a-bus. As shown in FIG. 16, in andn/orn operations, the values of a-bus data a0 to a7 for computation are inverted, and so there is the possibility that correction conditions are inverted for andn and orn. However, parity is a signal indicating whether the number of "1" bits in data is even or odd, and the following equation (9) is obtains.

[Equation 9]

$$x \oplus y = \overline{x} \ominus \overline{y} \quad (9)$$

From this it is seen that when parity is assigned to data with an even number of "1" bits, the difference in polarity between andn and orn is no longer present. As one example, when one parity bit is assigned to data with an 8-bit width, the predicted parity rpandn is as given in equation (10) below, and the predicted parity rporn is as in equation (11) below, so that there is no difference in the correction terms for andn and orn.

[Equation 10]

$$rp_{andn} = rp_{and} \oplus (a_7 \oplus \ldots \oplus a_0) \quad (10)$$
$$= pchg_{and} \oplus \overline{ap \oplus bp} \oplus (a_7 \oplus \ldots \oplus a_0)$$
$$= pchg_{and} \oplus \overline{bp} \oplus (ap \oplus a_7 \oplus \ldots \oplus a_0)$$

[Equation 11]

$$rp_{orn} = rp_{or} \oplus (\overline{a_7} \oplus \ldots \oplus \overline{a_0}) \quad (11)$$
$$= rp_{or} \oplus (a_7 \oplus \ldots \oplus a_0)$$
$$= pchg_{or} \oplus \overline{ap \oplus bp} \oplus (a_7 \oplus \ldots \oplus a_0)$$
$$= pchg_{or} \oplus \overline{bp} \oplus (ap \oplus a_7 \oplus \ldots \oplus a_0)$$

That is, using the output abus_eor of the EOR TREE circuit 3 in FIG. 1 and FIG. 4, indicating the number of "1" bits on the a bus, in andn/orn computations, the and/or parity can be corrected.

Next, if examined as single bits, the andn1 parity inversion condition of FIG. 6 is seen to be the opposite of the orn parity inversion condition of FIG. 8. Hence when applying equation (9), the andn1 predicted parity rpandn1 becomes the orn predicted parity rporn by means of the following equation (12).

[Equation 12]

$$rp_{andn1} = (\overline{pc_{orn7}} \oplus \ldots \oplus \overline{pc_{orn0}}) \oplus \overline{ap \oplus bp} \quad (12)$$
$$= (pc_{orn7} \oplus \ldots \oplus pc_{orn0}) \oplus \overline{(ap \oplus bp)}$$
$$= rp_{orn}$$

Similarly, the orn1 parity inversion condition of FIG. 9, if examined as single bits, is seen to be the opposite of the andn parity inversion condition of FIG. 5. Hence when applying equation (9), the orn1 predicted parity rporn1 becomes the andn predicted parity rpandn by means of the following equation (13).

[Equation 13]

$$rp_{orn1} = (\overline{pc_{andn7}} \oplus \ldots \oplus \overline{pc_{andn0}}) \oplus \overline{ap \oplus bp} \quad (13)$$
$$= (pc_{andn7} \oplus \ldots \oplus pc_{andn0}) \oplus \overline{(ap \oplus bp)}$$
$$= rp_{andn}$$

Similarly, the andn2 parity inversion condition of FIG. 7, if examined as single bits, is seen to be the opposite of the or-parity inversion condition of FIG. 18. Hence the andn2 predicted parity rpandn2 becomes the or-predicted parity rpor. And, the orn2 parity inversion condition of FIG. 10, if examined as single bits, is seen to be the opposite of the and-parity inversion condition of FIG. 17. Hence the orn2 predicted parity rporn2 becomes the and-predicted parity rpand.

Next, as an example of parity assigned for an odd number of bits, a case is similarly explained in which one parity bit is assigned to data with a width of 9 bits. First, similarly to equation (10), the predicted parity rpandn is as in equation (14) below, and similarly to equation (11), the predicted parity rporn is as in equation (15) below.

[Equation 14]

$$rp_{andn} = rp_{and} \oplus (a_8 \oplus \ldots \oplus a_0) \quad (14)$$
$$= pchg_{and} \oplus \overline{ap \oplus bp} \oplus (a_8 \oplus \ldots \oplus a_0)$$
$$= pchg_{and} \oplus \overline{bp} \oplus (ap \oplus a_8 \oplus \ldots \oplus a_0)$$

-continued

[Equation 15]

$$\begin{aligned}rp_{orn} &= rp_{or} \oplus \overline{(\overline{a_8} \oplus \ldots \oplus \overline{a_0})} \quad (15)\\ &= rp_{or} \oplus \overline{(a_8 \oplus \ldots \oplus a_0)}\\ &= pchg_{or} \oplus \overline{ap \oplus bp} \oplus \overline{(a_8 \oplus \ldots \oplus a_0)}\\ &= pchg_{or} \oplus (ap \oplus bp) \oplus (a_8 \oplus \ldots \oplus a_0)\\ &= pchg_{or} \oplus bp \oplus (ap \oplus a_8 \oplus \ldots \oplus a_0)\end{aligned}$$

That is, for rpandn the equation is the same as for an even number of bits, with a bit expansion added. On the other hand, in the case of rporn the result is inverted compared with equation (11) for an even number with the bit expansion. This is because the correction term inverts a0 to a8 and ap. Hence using the output abus_eor of the EOR TREE circuit 3 of FIG. 1 and FIG. 4, indicating the number of "1" bits on the a-bus, the and/or parity can be corrected in andn/orn computations.

Next, the andn1 parity inversion condition of FIG. 6, if examined as single bits, is seen to be the opposite of the orn parity inversion condition of FIG. 8. Hence applying equation (9), the andn1 predicted parity rpandn1 becomes the orn predicted parity rporn by means of the following equation (16).

[Equation 16]

$$\begin{aligned}rp_{andn1} &= (\overline{pc_{orn8}} \oplus \ldots \oplus \overline{pc_{orn0}}) \oplus \overline{ap \oplus bp} \quad (16)\\ &= \overline{(pc_{orn8} \oplus \ldots \oplus pc_{orn0})} \oplus \overline{(ap \oplus bp)}\\ &= \overline{(pc_{orn8} \oplus \ldots \oplus pc_{orn0}) \oplus (ap \oplus bp)}\\ &= \overline{rp_{orn}}\end{aligned}$$

Similarly, the orn1 parity inversion condition of FIG. 9, if examined as single bits, is seen to be the opposite of the andn parity inversion condition of FIG. 5. Hence applying equation (9), the orn1 predicted parity rporn1 becomes the andn predicted parity rpandn by means of the following equation (17).

[Equation 17]

$$\begin{aligned}rp_{orn1} &= (\overline{pc_{andn8}} \oplus \ldots \oplus \overline{pc_{andn0}}) \oplus \overline{ap \oplus bp} \quad (17)\\ &= \overline{(pc_{andn8} \oplus \ldots \oplus pc_{andn0})} \oplus \overline{(ap \oplus bp)}\\ &= \overline{(pc_{andn8} \oplus \ldots \oplus pc_{andn0}) \oplus (ap \oplus bp)}\\ &= \overline{rp_{andn}}\end{aligned}$$

Similarly, the andn2 parity inversion condition of FIG. 7, if examined as single bits, is seen to be the opposite of the or-parity inversion condition of FIG. 18. Hence the andn2 predicted parity rpandn2 becomes the or-predicted parity rpor by means of the following equation (18).

[Equation 18]

$$\begin{aligned}rp_{andn2} &= (\overline{pc_{or8}} \oplus \ldots \oplus \overline{pc_{or0}}) \oplus \overline{ap \oplus bp} \quad (18)\\ &= \overline{(pc_{or8} \oplus \ldots \oplus pc_{or0})} \oplus \overline{(ap \oplus bp)}\\ &= (pc_{or8} \oplus \ldots \oplus pc_{or0}) \oplus \overline{(ap \oplus bp)}\\ &= \overline{rp_{or}}\end{aligned}$$

Further, the orn2 parity inversion condition of FIG. 10, if examined as single bits, is seen to be the opposite of the and-parity inversion condition of FIG. 17. Hence the orn2 predicted parity rporn2 becomes the and-predicted parity rpand by means of the following equation (19).

[Equation 19]

$$\begin{aligned}rp_{orn2} &= (\overline{pc_{and8}} \oplus \ldots \oplus \overline{pc_{and0}}) \oplus \overline{ap \oplus bp} \quad (19)\\ &= \overline{(pc_{and8} \oplus \ldots \oplus pc_{and0})} \oplus \overline{(ap \oplus bp)}\\ &= \overline{(pc_{and8} \oplus \ldots \oplus pc_{and0})} \oplus \overline{(ap \oplus bp)}\\ &= \overline{rp_{and}}\end{aligned}$$

In these equations, the rporn condition inversion is used in the parity prediction rpandn1, and the rpandn condition inversion is used in the parity prediction rporn1, and data used in correction can only be used in EOR of the data on the a bus.

FIG. 11 shows the relation between instructions and the selection signals SEL1, SEL2, and "invert parity", when a parity bit is added to an odd number of bits in the configuration of FIG. 1. In FIG. 11, the selection signal SEL1 is a signal which controls the selector 6, causing the logic for parity prediction used to be either the and type or the or type. That is, the selector 6 selects the output of the AND prediction logic circuit 1 when the selection signal SEL1 is pchgand, and selects the output of the OR prediction logic circuit 2 when the selection signal SEL1 is pchgor.

As explained above, and types are and, andn (equation (14)), orn1 (equation (17)), and orn2 (equation (19)); or types are or, orn (equation (15)), andn1 (equation (16)), and andn2 (equation (18)).

The selection signal SEL2 is a signal which controls whether to use the output abus_eor, a correction term, of the EOR TREE circuit 3, and is input to the AND circuit 8. That is, a selection signal SEL2 of "1" indicates that abus_eor is used; this is andn according to equation (14), orn according to equation (15), andn1 according to equation (16), and orn1 according to equation (17). Similarly, a selection signal SEL2 of "0" indicates that abus_eor is not to be used; according to and, or, and equation (18), this is andn2, and according to equation (19), this is orn2.

The "invert parity" value controls inversion occurring as a result of the use of inversion of the parity change condition, as in the case of the inversion of 'a' in the correction term and in the case of andn1 and orn, and is input to EOR circuit 5. When "invert parity" is "1", the EOR circuit 5 executes inversion to perform correction. This is, from equation (15), orn, from equation (17), orn1, from equation (18), andn2, and from equation (19), orn2.

In this way, using the selection signals SEL1 and SEL2, "invert parity", and the output abus_eor of the EOR TREE circuit 3 of FIG. 1 and FIG. 4 indicating the number of "1" bits on the a-bus, in and/or parity prediction computations, parity predictions can be performed for andn, andn1, andn2/orn, orn1, and orn2.

FIG. 12 shows the relation between instructions and the selection signals SEL1, SEL2, and "invert parity", when a parity bit is added to an even number of bits in the configuration of FIG. 1. In FIG. 12, the selection signal SEL1 is a signal which controls the selector 6, causing the logic for parity prediction used to be either the and type or the or type. That is, the selector 6 selects the output of the AND prediction logic circuit 1 when the selection signal SEL1 is pchgand, and selects the output of the OR prediction logic circuit 2 when the selection signal SEL1 is pchgor.

As explained above, and types are and, andn (equation (10)), orn1 (equation (13)), and orn2; or types are or, orn (equation (11)), andn1 (equation (12)), and andn2.

The selection signal SEL2 is a signal which controls whether to use the output abus_eor, a correction term, of the EOR TREE circuit 3, and is input to the AND circuit 8. That is, a selection signal SEL2 of "1" indicates that abus_eor is used; this is andn according to equation (10), orn according to equation (11), andn1 according to equation (12), and orn1 according to equation (13). Similarly, a selection signal SEL2 of "0" indicates that abus_eor is not to be used; this is the case for and, or, andn2, and orn2.

The "invert parity" value controls inversion occurring as a result of the use of inversion of the parity change condition, as in the case of the inversion of 'a' in the correction term and in the case of andn1 and orn, and is input to EOR circuit 5. When "invert parity" is "1", the EOR circuit 5 executes inversion to perform correction. For an even number of bits, from equation (10) through equation (13), inversion is not executed. That is, "invert parity" is "0".

In this way, using the selection signals SEL1 and SEL2, "invert parity", and the output abus_eor of the EOR TREE circuit 3 of FIG. 1 and FIG. 4 indicating the number of "1" bits on the a-bus, in and/or parity prediction computations, parity predictions can be performed for andn, andn1, andn2/orn, orn1, and orn2.

Figure 19:
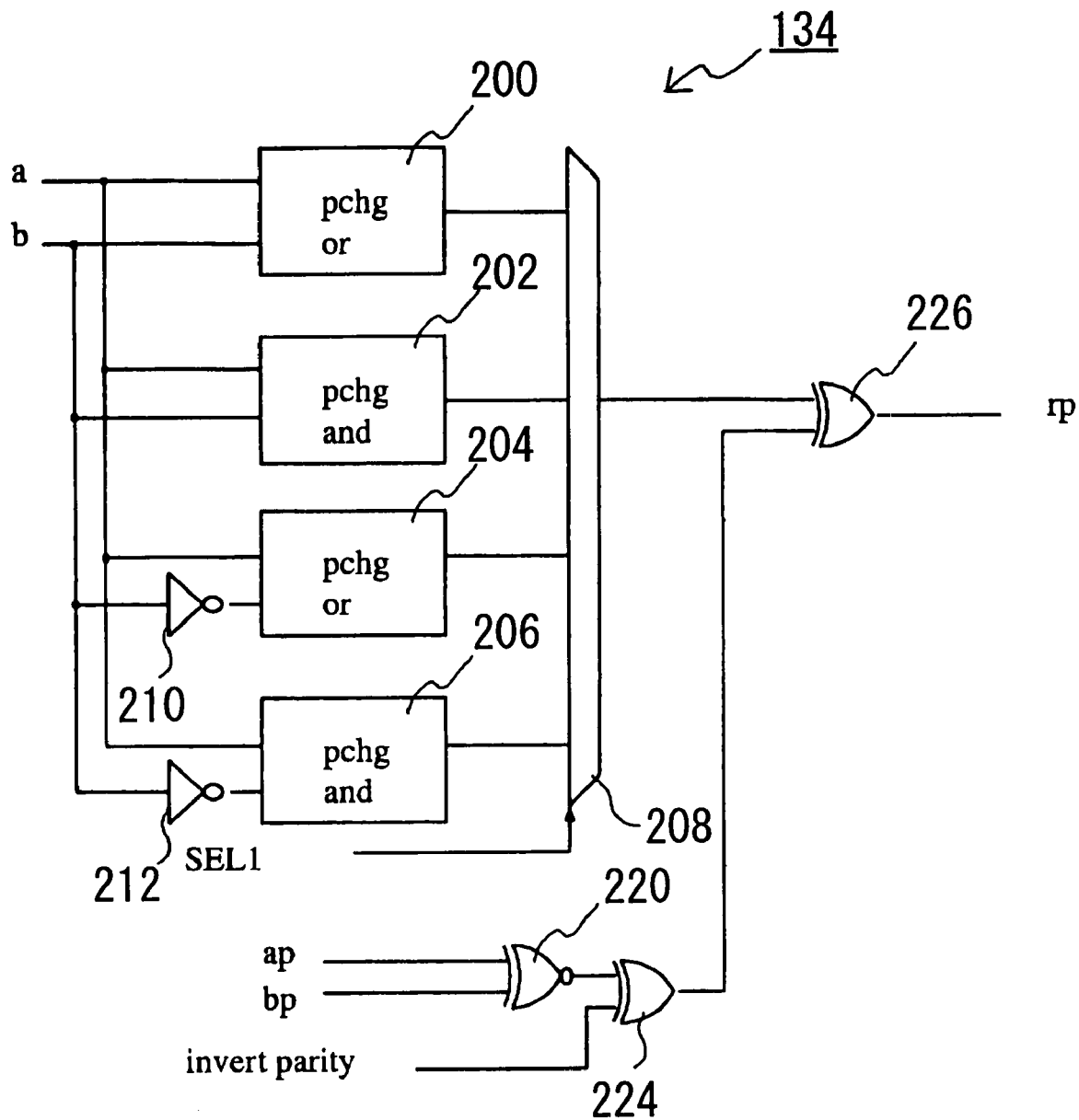
FIG. 19 is a circuit diagram of a first logic operation parity prediction circuit of the prior art.
Figure 20:
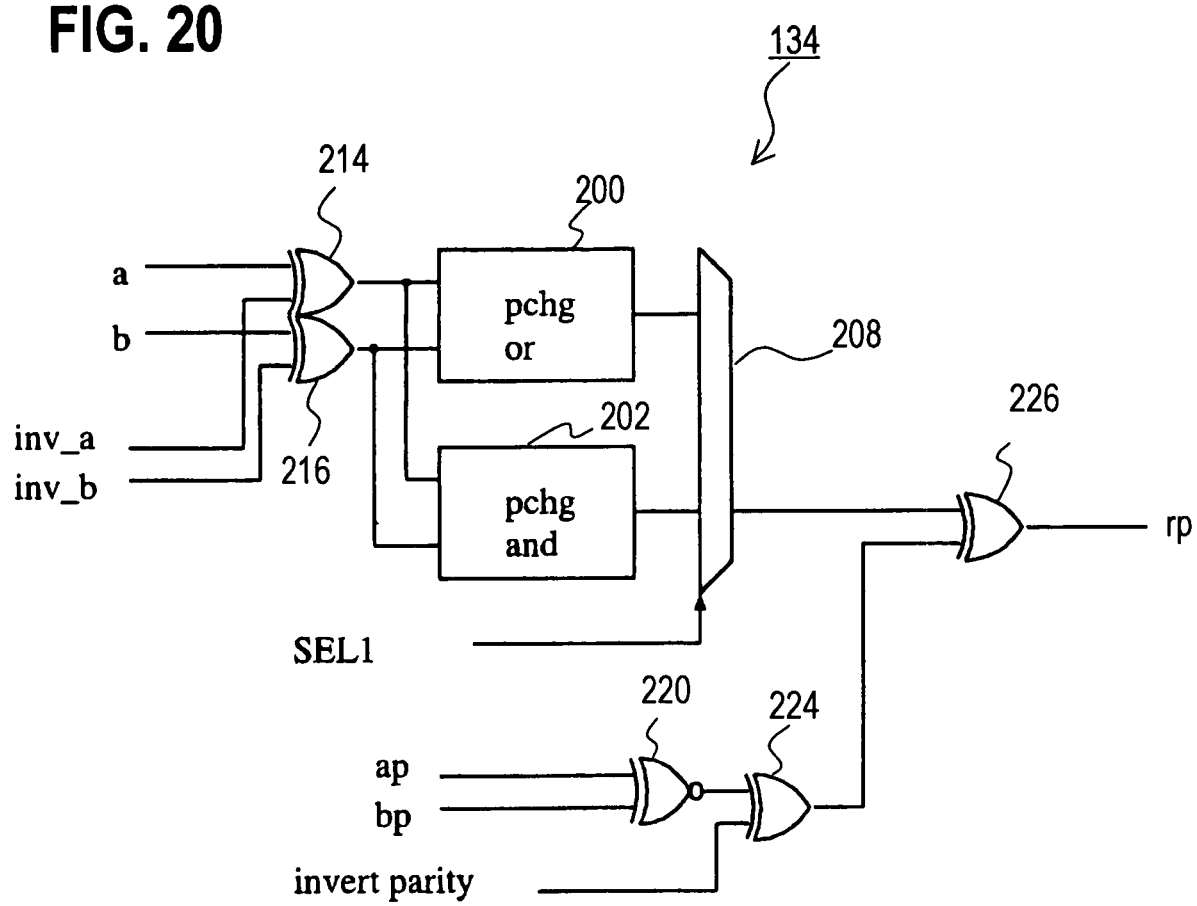
FIG. 20 is a circuit diagram of a second logic operation parity prediction circuit of the prior art.

That is, instead of providing the inverter circuits (214, 216) in FIG. 20 of the prior art and performing andn/orn parity computation, in this invention the andn/orn parity is predicted in advance, and the andn/orn and/or difference is determined separately using the EOR TREE circuit 3, to perform correction. Hence compared with FIG. 19 the configuration is simplified, and compared with FIG. 20, faster parity prediction is possible, to the extent that the inverter circuits (214, 216) can be omitted.

Second Embodiment

Figure 13:
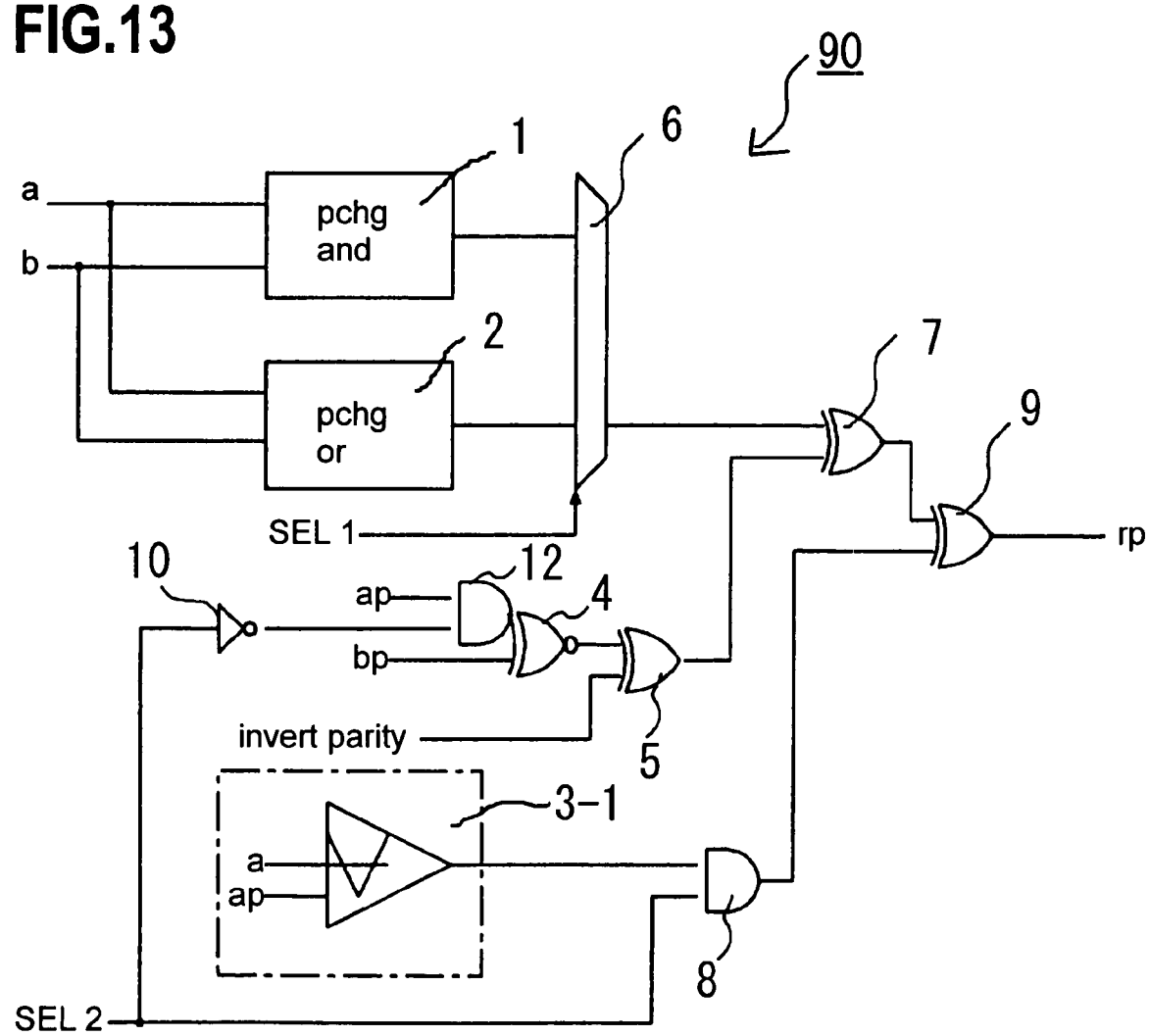
FIG. 13 is a circuit diagram of the logic operation parity prediction circuit of a second embodiment of the invention.
Figure 14:
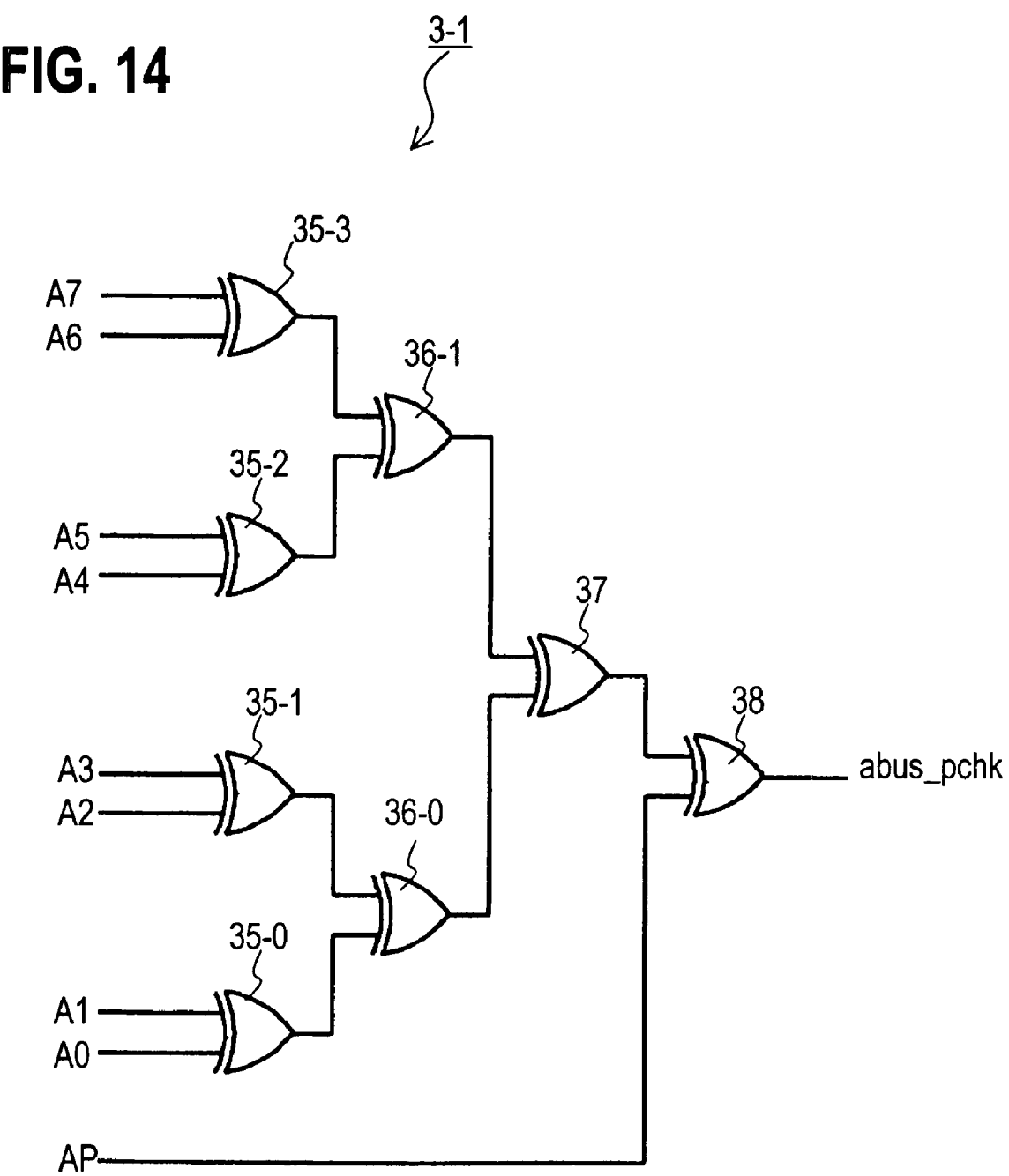
FIG. 14 is a circuit diagram of the parity check circuit of FIG. 13.

FIG. 13 shows the configuration of the logic operation parity prediction circuit of a second embodiment of the invention, and FIG. 14 shows the configuration of the parity check circuit of FIG. 13.

In FIG. 13, portions which are the same as in FIG. 1 are shown with the same symbols; the AND prediction logic circuit (pchg and) 1 is the logic circuit for parity inversion condition generation in AND operations explained in FIG. 2. The OR prediction logic circuit (pchg or) 2 is the logic circuit for parity inversion condition generation in OR operations explained in FIG. 3. The parity check circuit 3-1 is a logic circuit, explained in FIG. 14, which checks the data on the a-bus using the parity bit ap.

The parity prediction circuit 90 has a selector 6, which selects the output of a prediction logic circuits 1 or 2 based on the selection signal SEL1; an inverter circuit 10, which inverts the selection signal SEL2; a gate circuit 12, which gates the a bus parity bit ap using the output of the inverter circuit 10; an inverting EOR circuit 4, which performs an EOR logic operation on the a-bus parity bit ap and the b-bus parity bit bp and inverts the result, in order to obtain the total number of "1"s in the data on the above-described a-bus and b-bus; an EOR circuit 5, which performs an EOR logic operation on the output of the EOR circuit 4 and an inverted parity signal (when parity of "1" is assigned to data with an odd number of bits, "1"); and an EOR circuit 7, which performs an EOR logic operation on the output of the selector 6 (inversion condition signal) and the output of the EOR circuit 5.

Further, the parity prediction circuit 90 has an AND circuit 8, which performs a logical product (AND) operation on the output of the parity check circuit 3-1 and the second selection signal SEL2, and an EOR circuit 9, which performs an EOR operation on the output of the EOR circuit 7 and the output of the AND circuit 7.

In the figure, the 'a' and 'b' signals indicate a-bus data and b-bus data respectively. Also, ap is the parity of the a-bus data, and bp is the parity of the b-bus data. The "invert parity" signal is a signal which takes a value depending on an instruction when the parity is "1" for data with an odd number of bits.

The following explanation is for a-bus data and b-bus data with an 8-bit width. The AND prediction logic circuit 1 computes pchgand of equation (2), as shown in FIG. 2. As shown in FIG. 3, the OR prediction logic circuit 2 computes pchgor of equation (4). Further, as shown in FIG. 14, the parity check circuit 3-1 has four EOR circuits 35-0 to 35-3, each of which compute the EOR of two bits among the a bus data A0 to A7; two EOR circuits 36-0 and 36-1, each of which compute the EOR of outputs of two EOR circuits among the EOR circuits 35-0 to 35-3; an EOR circuit 37, which computes the EOR of the outputs of the two EOR circuits 36-0 and 36-1; and an EOR circuit 38, which computes the EOR of the output of the EOR circuit 37 and the a bus parity bit ap, and outputs a bus_pchk.

The logic operation parity prediction logic circuit of this embodiment is essentially the same as that of the example shown in FIG. 1, but the result of a parity checker 3-1 is used as an input, and so the parity bit ap is input to the parity checker 3-1. Consequently in the portion of the ap/bp EOR circuit 4 used in prediction, the selection signal SEL2 controls whether the parity bit ap is passed.

Similarly when one parity is prepared for data with an odd number of bits, the different control signals execute control as indicated in FIG. 11 for the different instructions. And in cases in which one parity is prepared for data with an even number of bits, each of the control signals executes control as indicated in FIG. 12 for the various instructions.

Hence similarly to the first embodiment, in and/or parity prediction computation, parity predictions can be performed for andn, andn1, andn2/orn, orn1, orn2 using the selection signals SEL1 and SEL2, "invert parity", and the output abus_pchk of the parity check circuit 3-1 of FIG. 13 and FIG. 14.

That is, instead of providing the inverter circuits (214, 216) in FIG. 20 of the prior art and performing andn/orn parity computation, in this invention the andn/orn parity is predicted in advance, and the andn/orn and/or difference is determined separately using the EOR TREE circuit 3, to perform correction. Hence compared with FIG. 19 the configuration is simplified, and compared with FIG. 20, faster parity prediction is possible, to the extent that the inverter circuits (214, 216) can be omitted. At the same time, a parity check of the a-bus can also be performed.

Other Embodiments

Figure 15:
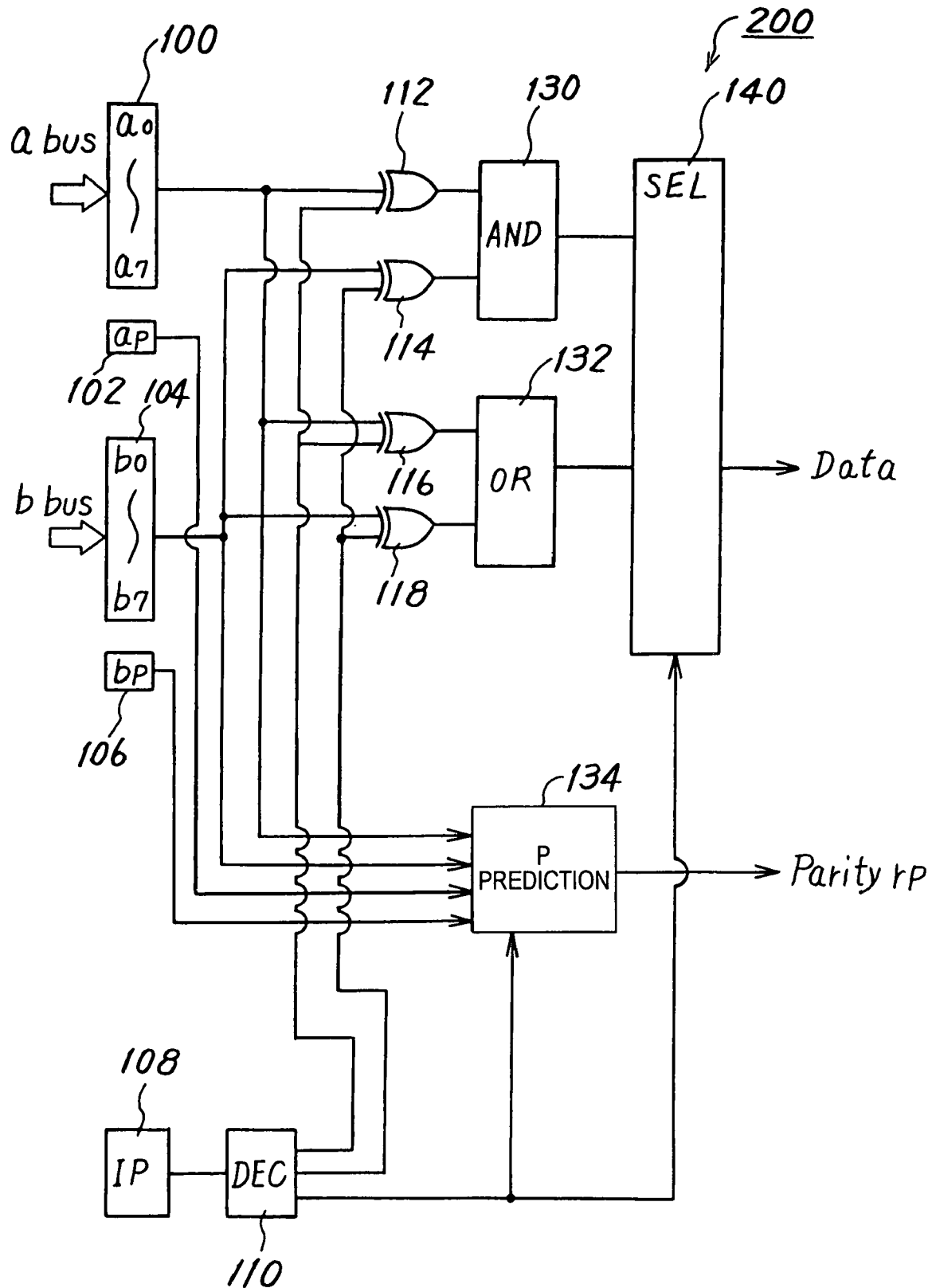
FIG. 15 shows the configuration of a logic operation circuit.

The logic operation parity prediction circuits of the above-described embodiments can be applied to the logic operation circuit of FIG. 15. Further, application to a logic operation circuit having an EOR circuit is also possible. And, when parity is added only to an even number of bits, as shown in FIG. 12, "invert parity" control is not performed, so that the EOR circuit 5 of FIG. 1 and FIG. 13 is unnecessary.

INDUSTRIAL APPLICABILITY

Because the prediction parity and inversion condition are corrected using an EOR condition for one data path, only two parity prediction logic circuits are necessary, and a correction logic circuit need only be added for the EOR condition for one data bus, so that the hardware configuration can be reduced. Further, in a circuit with normal polarity added, because in nearly all cases inspections of input data are performed, these inspection logic functions can be used in common as correction logic; this can be realized with no increase in hardware. Further, control signals from opcode signals are employed in the latter half of the logic operations, and so parity prediction is possible at high speed comparable with circuits which have parity prediction logic for each instruction.

The invention claimed is:

1. A logic operation parity prediction circuit, which predicts a parity of an execution result of a logic operation on a pair of input operands, comprising:
    a first parity inversion condition computation circuit, which computes the parity inversion condition for AND logic operations for said pair of input operands;
    a second parity inversion condition computation circuit, which computes the parity inversion condition for OR logic operations for said pair of input operands;
    a selector, which selects the parity inversion condition of said first parity inversion condition computation circuit or of said second parity inversion condition computation circuit, according to a logic operation instruction;
    a parity prediction circuit, which performs EOR operations on parity bits of said pair of input operands;
    a correction signal generation circuit, which performs EOR operations on one of the input operands and generates a correction signal; and
    a correction circuit, which uses said correction signal and said parity inversion condition of said selector to correct the parity prediction signal of said parity prediction circuit, and outputs a predicted parity according to said logic operation instruction.

2. The logic operation parity prediction circuit according to claim 1, wherein said correction signal generation circuit comprises an EOR circuit which performs EOR operations on said one operand.

3. The logic operation parity prediction circuit according to claim 1, wherein said correction signal generation circuit comprises a parity inspection circuit for said one operand.

4. The logic operation parity prediction circuit according to claim 1, wherein said logic operation instruction comprises a logical AND and a logical OR instruction including an AND and OR instruction of the inverse of at least one of the operands.

5. The logic operation parity prediction circuit according to claim 1, further comprising a selection circuit, which selectively outputs said correction signal of said correction signal generation circuit to said correction circuit, using a second selection signal according to said logic operation instruction.

6. The logic operation parity prediction circuit according to claim 1, wherein said correction circuit comprises:
    a first EOR circuit, which performs EOR operations on said parity inversion condition of said selector and said parity prediction signal of said parity prediction circuit; and
    a second EOR circuit, which performs EOR operations on the output of said first EOR circuit and said correction signal, and outputs a predicted parity according to said logic operation instruction.

7. The logic operation parity prediction circuit according to claim 1, wherein further comprising a control circuit, which controls the predicted parity of said parity prediction circuit according to said logic operation instruction.

8. The logic operation parity prediction circuit according to claim 3, wherein said parity inspection circuit comprises an operation circuit which performs EOR operations on the EOR result of said one operand and a parity bit of said one operand.

9. The logic operation parity prediction circuit according to claim 3, wherein further comprising a selection circuit which selectively outputs said correction signal of said correction signal generation circuit to said correction circuit, using a second selection signal according to said logic operation instruction,
    and wherein said parity prediction circuit comprises:
    a gate circuit which gates a parity bit of said one operand using the inverse signal of said second selection signal; and
    an EOR circuit which performs EOR operations on the output of said gate circuit and the parity bit of said other operand.

10. A logic operation circuit, comprising:
    a logic operator which executes logic operations on a pair of input operands and outputs a logic operation result; and
    a logic operation parity prediction circuit which predicts the parity of said logic operation result,
    wherein said logic operation parity prediction circuit comprises:
    a first parity inversion condition computation circuit, which computes the parity inversion condition for AND logic operations for said pair of input operands;
    a second parity inversion condition computation circuit, which computes the parity inversion condition for OR logic operations for said pair of input operands;
    a selector, which selects the parity inversion condition of said first parity inversion condition computation circuit or of said second parity inversion condition computation circuit, according to a logic operation instruction;
    a parity prediction circuit, which performs EOR operations on parity bits of said pair of input operands;
    a correction signal generation circuit, which performs EOR operations on one of the input operands, and generates a correction signal; and
    a correction circuit, which uses said correction signal and said parity inversion condition of said selector to correct the parity prediction signal of said parity prediction circuit, and outputs a predicted parity according to said logic operation instruction.

11. The logic operation circuit according to claim 10, wherein said correction signal generation circuit comprises an EOR circuit which performs EOR operations on said one operand.

12. The logic operation circuit according to claim 10, wherein said correction signal generation circuit comprises a parity inspection circuit for said one operand.

13. The logic operation circuit according to claim 10, wherein said logic operation instruction comprises a logical AND and a logical OR instruction including an AND and OR instruction of the inverse of at least one of the operands.

14. The logic operation circuit according to claim 10, further comprising a selection circuit, which selectively outputs said correction signal of said correction signal generation circuit to said correction circuit, using a second selection signal according to said logic operation instruction.

15. The logic operation circuit according to claim 10, wherein said correction circuit comprises:
   a first EOR circuit, which performs EOR operations on said parity inversion condition of said selector and said parity prediction signal of said parity prediction circuit; and
   a second EOR circuit, which performs EOR operations on the output of said first EOR circuit and said correction signal, and outputs a predicted parity according to said logic operation instruction.

16. The logic operation circuit according to claim 10, further comprising a control circuit, which controls the predicted parity of said parity prediction circuit according to said logic operation instruction.

17. The logic operation circuit according to claim 12, wherein said parity inspection circuit comprises an operation circuit which performs EOR operations on the EOR result of said one operand and a parity bit of said one operand.

18. The logic operation circuit according to claim 12, further comprising a selection circuit which selectively outputs said correction signal of said correction signal generation circuit to said correction circuit, using a second selection signal according to said logic operation instruction,
   and wherein said parity prediction circuit comprises:
   a gate circuit which gates a parity bit of said one operand using the inverse signal of said second selection signal; and
   an EOR circuit which performs EOR operations on the output of said gate circuit and the parity bit of said other operand.

* * * * *